No. 3,807.
REISSUED JAN. 25, 1870.
C. STETEFELDT.
FURNACE FOR ROASTING AND TREATING ORES.
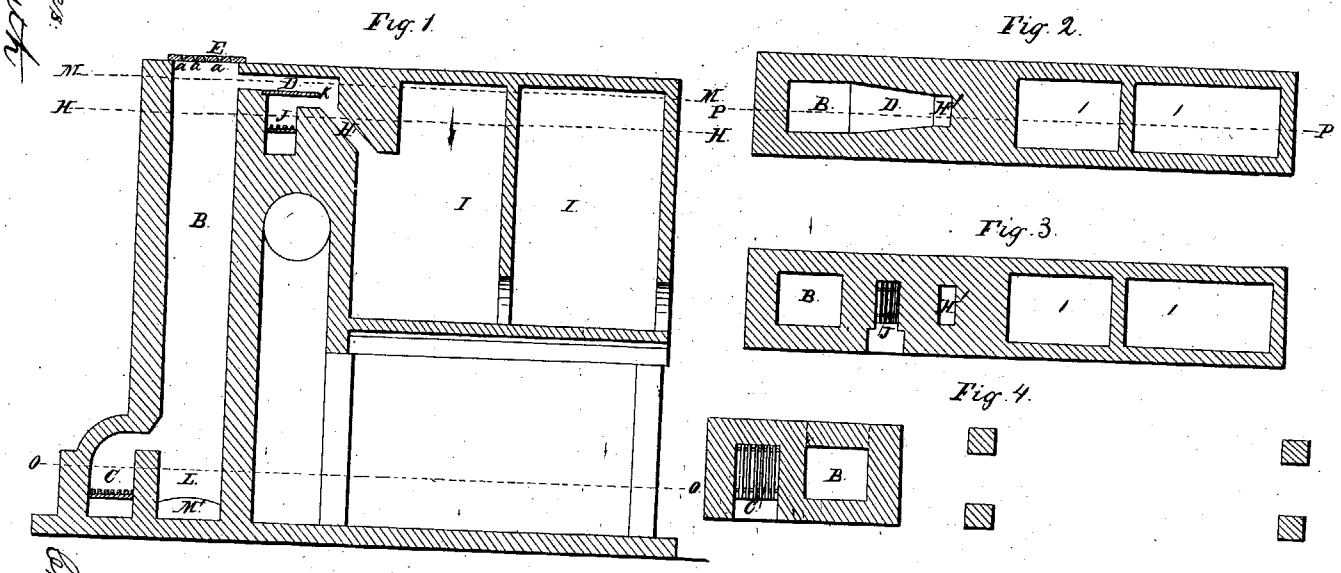
Witnesses:
C. W. M. Smith
Geo. H. Strong
Inventor:
Chas. A. Stetefeldt
By his Attys
Dewey & Co.

UNITED STATES PATENT OFFICE.

CHARLES STETEFELDT, OF AUSTIN, NEVADA.

IMPROVEMENT IN FURNACES FOR ROASTING AND TREATING ORES.

Specification forming part of Letters Patent No. 72,931, dated December 31, 1867; reissue No. 3,807, dated January 25, 1870.

DIVISION A.

*To all whom it may concern:*

Be it known that I, CHARLES STETEFELDT, of Austin, county of Lander, State of Nevada, have invented certain new and useful Improvements in Furnaces for Chloridizing Silver-Ores; and I do hereby declare the following description, and accompanying drawings, are sufficient to enable any person skilled in the art or science to which it most nearly appertains to make and use my said invention or improvements, without further invention or experiment.

My invention is intended to provide an improved furnace for chloridizing silver-ores preparatory to amalgamation. This furnace is constructed with a shaft, the fall of the ore through which is retarded by the upward motion of the heated air and chloridizing-gases combined with a fire-place, opening into a canal below the flue.

The flame or heated air, passing up the shaft, heats the particles of the falling ore, retarding their fall, and effecting their perfect desulphurization and chlorination, which latter is, to a great extent, achieved by the chlorine, hydrochloric acid, and volatile chlorides, which continue to emanate from the roasted ore accumulated in the bottom of the shaft.

A flue at the top of the shaft allows the gases to pass into a series of dust-chambers, connected with a chimney.

As the ore has to be pulverized very fine, preparatory to amalgamation, or other processes of extraction, a part of the charge will necessarily be carried by the draft, directly through the flue, into the dust-chambers, and is consequently either entirely raw, or, at least, imperfectly chloridized.

To effect a perfect chlorination of this part of the ore, a small fire-place, built at the upper end of the shaft, is connected with the flue, and, as the ore is so very fine, and in an atmosphere of chloridizing-gases, its chlorination is completed in a moment, in passing the flame in the flue.

To more fully illustrate and describe my furnace, reference is had to the accompanying drawings, and letters marked thereon, of which—

Figure 1 is a section, taken through P P. Fig. 2 is a section, through M M. Fig. 3 is a section, through H H. Fig. 4 is a section, through O O.

B represents the perpendicular shaft of the furnace, covered at the top with the iron plate E, through the slits *a a a* in which the pulp or pulverized ore and salt are continuously fed by rollers. C is the fire-place, near the lower end of the shaft, from which the flame and gases pass up the shaft B, and through the flue D and H′, into the dust-chambers I I. J is the small fire-place, at the upper end of the shaft, opening below the flue D, into its continuation H′, which may be constructed inclined or level. Here the ore is chloridized which is too fine and light to fall down the shaft B.

In order to heat the gases in the flue D, before they meet the flame from the fire-place J, the arch of the fire-place J is formed by an iron plate, K.

In the lower part L of the shaft B the roasted ore accumulates, and is discharged through the door M′.

The operation of my furnace is as follows, to wit: Fire is made in the fire-places C and J, and, as soon as the inner walls of the shaft are red hot, the rollers are put in motion, and the ore is fed, in continuous streams, through the slits *a a a* in the iron plate E.

To accomplish an intimate mixture of the ore and salt, it is best to crush them together in a dry-crushing battery.

The only attention which the furnace requires is the keeping up of a regular roasting-heat.

The roasted ore is allowed to accumulate in the bottom of the shaft nearly up to the fire-bridge of the fire-place C. This is very important, as a great amount of chlorine, hydrochlorine acid, and volatile chlorides emanates from the charge, and acts upon the falling ore in the shaft. If the ore accumulates too much, a part is discharged through the door $m'$, but so as to allow no cold air to enter the shaft.

The ore which is roasted in the flue H′ by the heat from the fire-place J, and deposited in the dust-chambers I I, is taken out from them occasionally.

What I claim as my invention, and desire to secure by Letters Patent of the United States, is—

The combination of a shaft, vertical, or nearly so, with a fire-place at or near the bottom, a flue leading from the upper part of the shaft, and an auxiliary fire-place for heating said flue.

CHARLES STETEFELDT.

Witnesses:
WILLIAM R. WRIGHT,
JOHN H. BOAST.